US009268958B1

(12) United States Patent
Kessler

(10) Patent No.: US 9,268,958 B1
(45) Date of Patent: Feb. 23, 2016

(54) PREVENTING THE LOSS OF SENSITIVE DATA SYNCHRONIZED WITH A MOBILE DEVICE

(71) Applicant: Symantec Corporation, Mountain View, CA (US)

(72) Inventor: Dirk Kessler, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 299 days.

(21) Appl. No.: 13/963,845

(22) Filed: Aug. 9, 2013

(51) Int. Cl.
    *G06F 21/00* (2013.01)
    *G06F 21/62* (2013.01)
    *G06F 21/30* (2013.01)
    *G06F 21/60* (2013.01)

(52) U.S. Cl.
    CPC .............. *G06F 21/62* (2013.01); *G06F 21/30* (2013.01); *G06F 21/60* (2013.01)

(58) Field of Classification Search
    CPC .......... G06F 21/30; G06F 21/60; G06F 21/62
    See application file for complete search history.

(56) References Cited

U.S. PATENT DOCUMENTS

| 8,776,249 | B1 * | 7/2014 | Margolin ........................ 726/26 |
| 2003/0056095 | A1 * | 3/2003 | Elliott et al. ................. 713/164 |
| 2004/0064710 | A1 * | 4/2004 | Vainstein ...................... 713/189 |
| 2009/0319529 | A1 * | 12/2009 | Bartlett et al. .................... 707/9 |
| 2010/0046015 | A1 * | 2/2010 | Whittle et al. ................. 358/1.9 |
| 2010/0100524 | A1 * | 4/2010 | Bae et al. ...................... 707/609 |
| 2013/0191887 | A1 * | 7/2013 | Davis et al. ........................ 726/5 |

OTHER PUBLICATIONS

Siemens et al. "Easy and Secure Access to Confidential Healthcare Data from Telematics Infrastructure." Sep. 29, 2006. p. 1-5.*

* cited by examiner

*Primary Examiner* — Michael S McNally
*Assistant Examiner* — Kendall Dolly
(74) *Attorney, Agent, or Firm* — Wilmer Cutler Pickering Hale and Dorr LLP

(57) ABSTRACT

A mobile device identifies a secure document that contains one or more context rules that correspond to the secure document. The mobile device determines whether a user is authorized to access the secure document based on the one or more context rules. The mobile device identifies an original document format for the secure document if the user is authorized to access the secure document and identifies an authorized application installed on the mobile device for accessing the secure document using the original document format. The authorized application corresponds to the original document format of the secure document. The mobile device sends the secure document to the authorized application.

17 Claims, 5 Drawing Sheets

PREVENTING THE LOSS OF SENSITIVE DATA SYNCHRONIZED WITH A MOBILE DEVICE

TECHNICAL FIELD

The present disclosure relates to sensitive data, and more particularly, to preventing the loss of sensitive data synchronized with a mobile device.

BACKGROUND

An Enterprise, such as, a business organization, can store data that may have sensitive content. Such sensitive data can come in the form of private or company information, intellectual property (IP), financial or patient information, credit-card data, and other information depending on the business and the industry. Data loss prevention (DLP) solutions generally detect sensitive data in documents and prevent unauthorized access, saving and/or sharing of the sensitive data. Traditional DLP solutions typically prevent unauthorized access, saving and/or sharing of the sensitive data by monitoring, detecting and blocking sensitive data while in-use (endpoint actions), in-motion (network traffic), and at-rest (data storage). Enterprise users, such as Enterprise employees, may wish to access the Enterprise data remotely. For example, a user may be traveling and may use a tablet computer and an insecure network, such as a hotel's public network, to access his or her Enterprise email account. The email may have sensitive Enterprise data. Generally mobile devices do not have the capability to run security agents to prevent the users from accessing the sensitive data using an insecure network. Conventional DLP solutions also typically do not prevent unauthorized attempts to copy or send sensitive data when the sensitive data is synchronized with a native mobile device application. For example, when the sensitive data is synchronized with a mobile email client, the sensitive data may be forwarded using non-authorized email accounts to unauthorized recipients. The sensitive data may be accessed using other applications installed on the mobile device and the other applications can be used to move the sensitive data from the mobile device to a non-sanctioned destination. Generally, mobile clients (e.g., email clients) do not provide extensibility mechanisms typically used to provide additional security capabilities such as data loss prevention, and may leave the sensitive data that is synchronized with a mobile device vulnerable to data loss.

SUMMARY

In one implementation, a system for preventing the loss of sensitive data synchronized with a mobile device is described. An exemplary system may include a mobile device that include a memory and a processing device that is coupled to the memory. In one embodiment, the mobile device identifies a secure document. The secure document includes one or more context rules that correspond to the secure document. The mobile device determines whether a user is authorized to access the secure document based on the one or more context rules. The mobile device identifies an original document format for the secure document if the user is authorized to access the secure document and identifies an authorized application installed on the mobile device for accessing the secure document using the original document format. The authorized application corresponds to the original document format of the secure document. The mobile device sends the secure document to the authorized application that is installed on the mobile device.

In one implementation, the mobile device determines whether the user is authorized to access the secure document by authenticating an identity of the user, determining a successful authentication of the identity of the user, reading the one or more context rules in the secure document in response to the successful authentication, and determining that the user is authorized to access the secure document based on the one or more context rules. In one implementation, the one or more context rules indicate one or more document operations authorized for the user. The one or more document operations include viewing the secure document, printing the secure document, sharing the secure document, modifying the secure document, and/or saving the secure document. In one implementation, the one or more document operations are enabled for the user by the authorized application. In one implementation, the secure document includes encrypted data to be decrypted by the authorized application. In one implementation, the secure document includes a header containing the one or more context rules. In one implementation, the secure document is formatted using an extension corresponding to a secure document format In addition, a non-transitory computer readable storage medium for preventing the loss of sensitive data synchronized with a mobile device is described. An exemplary non-transitory computer readable storage medium includes instructions that will cause a processing device to identify a secure document that contains one or more context rules that correspond to the secure document, determine whether a user is authorized to access the secure document based on the one or more context rules, identify an original document format for the secure document if the user is authorized to access the secure document, identify an authorized application installed on the mobile device for accessing the secure document using the original document format, and send the secure document to the authorized application. The authorized application corresponds to the original document format of the secure document.

Further, a method for preventing the loss of sensitive data synchronized with a mobile device is described. In one embodiment, a method comprises identifying a secure document that contains one or more context rules that correspond to the secure document, determining whether a user is authorized to access the secure document based on the one or more context rules, identifying an original document format for the secure document if the user is authorized to access the secure document, identifying an authorized application installed on the mobile device for accessing the secure document using the original document format, and sending the secure document to the authorized application. The authorized application corresponds to the original document format of the secure document, Further, a method for preventing the loss of sensitive data synchronized with a mobile device is described. In one embodiment, a method comprises identifying, by a server computer system, sensitive data in an original document to be sent to a mobile device, identifying one or more context rules that correspond to the original document, transforming the original document into a secure document that includes the one or more context rules; and sending the secure document to the mobile device.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and system for preventing the loss of sensitive data synchronized with a mobile device, according to various implementations. Implementations of the present disclosure enforce data loss prevention policies on a mobile device. Implementations of the present disclosure provide the additional benefit of avoiding the execution of CPU (central processing unit) and memory intensive operations for determining whether a document contains sensitive data on relatively resource constrained mobile devices in comparison to server hardware. For example, a user, John Smith, may be an employee of Acme, Inc. and may use his tablet computer to receive email messages that contain sensitive data pertaining to Acme, Inc. Implementations of the present disclosure can determine at a proxy server whether the email messages contain sensitive data and can encrypt any sensitive data before the email messages are sent to and/or synchronized with the tablet computer of John Smith.

The proxy server can create a secure document that contains the encrypted sensitive data and a header that contains policy data (e.g., context rules) that specify which users are authorized to access the secure document and specify what document operations (e.g., view, print, modify, save, share, etc.) the users are authorized to perform for the secure document. The proxy server can send the secure document to the mobile device (e.g., John Smith's tablet computer). The tablet computer can include a viewer proxy module to prevent John Smith from accessing the encrypted sensitive data unless the viewer proxy module determines that John Smith is authorized to access the encrypted sensitive data and that there is an authorized application that is installed on the tablet computer for accessing the encrypted sensitive data. If John Smith is authorized to access the secure document, the viewer proxy module can locate an authorized application that is installed on the mobile device and can send the secure document to the authorized application. The authorized application can decrypt the encrypted sensitive data and provide the decrypted sensitive data to the user, for example, via a graphical user interface (GUI). The authorized application can disable any operations (e.g., print, modify, save, share, etc.) that the user is not authorized to perform. For example, if John Smith is not authorized to print the sensitive data, the authorized application can disable the print option in the GUI.

Figure 1:
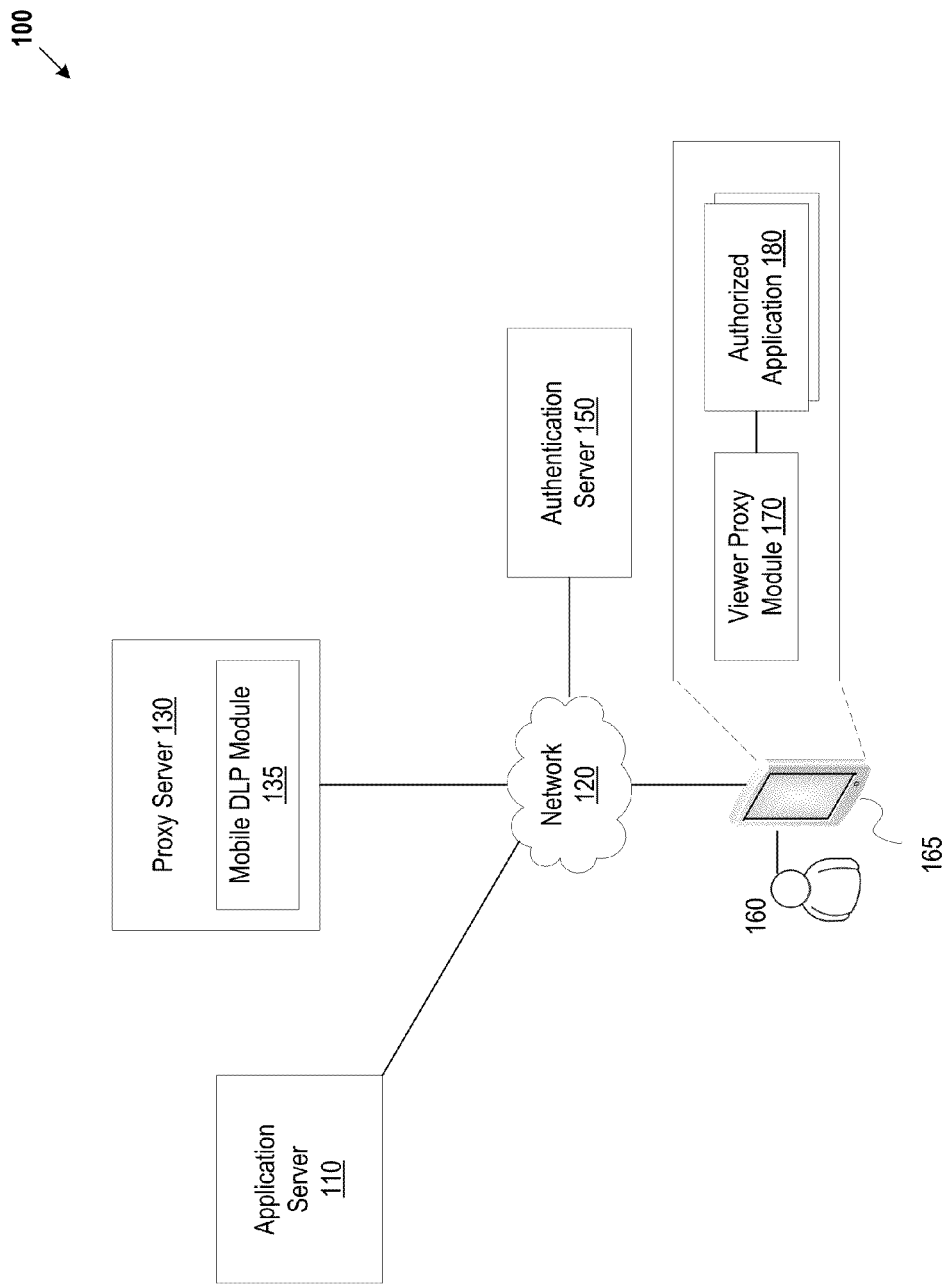
FIG. 1 illustrates example system architecture, in accordance with various implementations.

FIG. 1 is an example system architecture 100 in which implementations of the present disclosure can be implemented. The system architecture 100 can include one or more servers 110,130,150, and one or more mobile devices 165 connected via one or more networks 120. The networks 120 can include one or more private networks (e.g., a local area network (LAN) or one or more wide area networks (WAN)), one or more public networks, one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 100 are not directly connected to each other. In one implementation, architecture 100 includes separate networks 120.

The mobile devices 165 can include devices, such as, cellular telephones, personal digital assistants (PDAs), portable media players, netbooks, laptop computers, electronic book readers, tablet computers, desktop computers, set-top boxes, gaming consoles, televisions, and the like. The servers 110, 130,150 can be one or more computing devices (such as a rackmount server, a router computer, a server computer, a personal computer, a mainframe computer, a laptop computer, a tablet computer, a desktop computer, etc.), data stores (e.g., hard disks, memories, databases), software components, and/or hardware components.

The architecture can include one or more application servers 110 that can host one or more applications and/or can provide one or more services. The application servers 110 can send documents to mobile devices 165 via the one or more networks 120. Documents hereinafter refer to a message and/or an attachment to the message. The documents can be for example, and are not limited to, messages (e.g., email messages, social networking message, text message, instant message, etc.), PDF (portable document format) documents, webpages (e.g., HTML documents, XML documents, etc.), text documents (e.g., Microsoft® Word® documents, plain text documents, Apache OpenOffice™ documents, etc.), spreadsheet documents (e.g., Microsoft® Excel® documents, etc.), database documents, presentation documents, CAD (computer-aided design) documents, etc. For brevity and simplicity, an email server is used as an example of an application server 110 throughout this document. For example, the application server 110 can send email messages to mobile devices 165.

An Enterprise can specify policies for handling sensitive data. An Enterprise can be an entity such as, and not limited to, any person, a business organization such as a corporation, an educational institution such as a college and university, etc. For example, an Enterprise, Acme, Inc., may have a policy that specified that sensitive data should be accessed only by authorized users. The policies can be implemented via one or more content rules and context rules. The content rules pertain to the content of a document and can define what data should be classified as sensitive data. For example, the content rules may include one or more algorithms for detecting personal identifiable information (e.g., SSNs, birthdates, credit card numbers, etc.), health data, intellectual property, confidential data, etc. The context rules pertain to the context of how the document can be accessed and can specify, for example, and is not limited to, which user identities and/or device identities are authorized to access the sensitive data, how the sensitive data can be used (e.g., view, print, modify, save, share, etc.), etc.

A document (e.g., message, PDF document, webpage, text document, spreadsheet document, database document, presentation document, CAD document, etc.) being sent from an application server 110 to a mobile device 165 may contain sensitive data. For example, the body of the email message and/or in an attachment to the email message may contain credit card information. Given that the mobile device 165 may be connected using a network 120 that may be either a public Wi-Fi or cellular data network, the system architecture 100 can include a proxy server 130 to implement data loss prevention (DLP) capabilities for documents (e.g., message, attachments, etc.) being sent to the mobile devices 165. The proxy server 130 can be an intermediary between the application server 110 (e.g., email server) and the mobile devices 165. The proxy server 130 can be a reverse proxy or a forward proxy.

The proxy server 130 can include a mobile DLP module 135 to protect the sensitive data before the sensitive data is sent to a mobile device 165. The mobile DLP module 135 can enforce content rules by intercepting and monitoring documents being sent from one or more application servers 110 (e.g., email server) to mobile devices 165, and evaluating the documents to determine whether the documents contain sensitive data. When a document contains sensitive data, the mobile DLP module 135 can transform the original document into a secure document. The secure document can have a file extension that corresponds to a secure document format. For example, the mobile DLP module 135 may use a proprietary secure document format for creating the secure document. For example, the secure document may have an extension ".sec" or ".sdf" file name extension.

The mobile DLP module 135 can encrypt the sensitive data before the sensitive data is synchronized with a mobile client on the mobile device 165. The mobile DLP module 135 can encrypt the sensitive data conditionally based on user (e.g., Enterprise system administrator) configured DLP policies that may be stored on a data store that is coupled to the proxy server 130. The mobile DLP module 135 can include the encrypted sensitive data and the context rules, which pertain to the sensitive data, in the secure document and can send the secure document to the mobile device 165.

The mobile device 165 can include a viewer proxy module 170 for accessing the secure document. The viewer proxy module 170 can enforce the context rules in the secure document. When the viewer proxy module 170 is installed on the mobile device 165, the viewer proxy module 170 can register itself with the operating system of the mobile device 165 as a viewer for the proprietary secure document format. For example, the viewer proxy module 170 can be registered for the proprietary secure file name extension (e.g., ".sec", ".sdf", etc.).

When the mobile device 165 receives a secure document the operating system can associate the secure document with the registered viewer proxy module 170. The viewer proxy module 170 can authenticate the identity of the user 160 and can determine from the context rules in the secure document whether the user 160 is authorized to access the secure document and what type of document operations the user 160 can perform. For example, the user 160 may be authorized to only view the secure document. One implementation of the viewer proxy module authenticating a user is described in greater detail below in conjunction with FIG. 4.

The viewer proxy module 170 can determine whether an authorized application 180 that corresponds to the secure document is installed on the mobile device 165. If an authorized application 180 is installed on the mobile device 165, the viewer proxy module 170 can launch the authorized application 180 and can send the secure document to the authorized application 180. In one implementation, if an authorized application 180 that corresponds to the secure document is not installed on the mobile device 165, the viewer proxy module 170 provides a notification to the user 160.

The authorized application 180 can provide the user 160 access to the sensitive data in the secure document. For example, the authorized application 180 may decrypt the encrypted sensitive data that is in the secure document. The authorized application 180 can read the context rules in the secure document to determine which document operations to enable and/or disable for the user 160. For example, the authorized application 180 may disable the print and save menu options in a user interface when the user 160 accesses the sensitive data.

Figure 2:
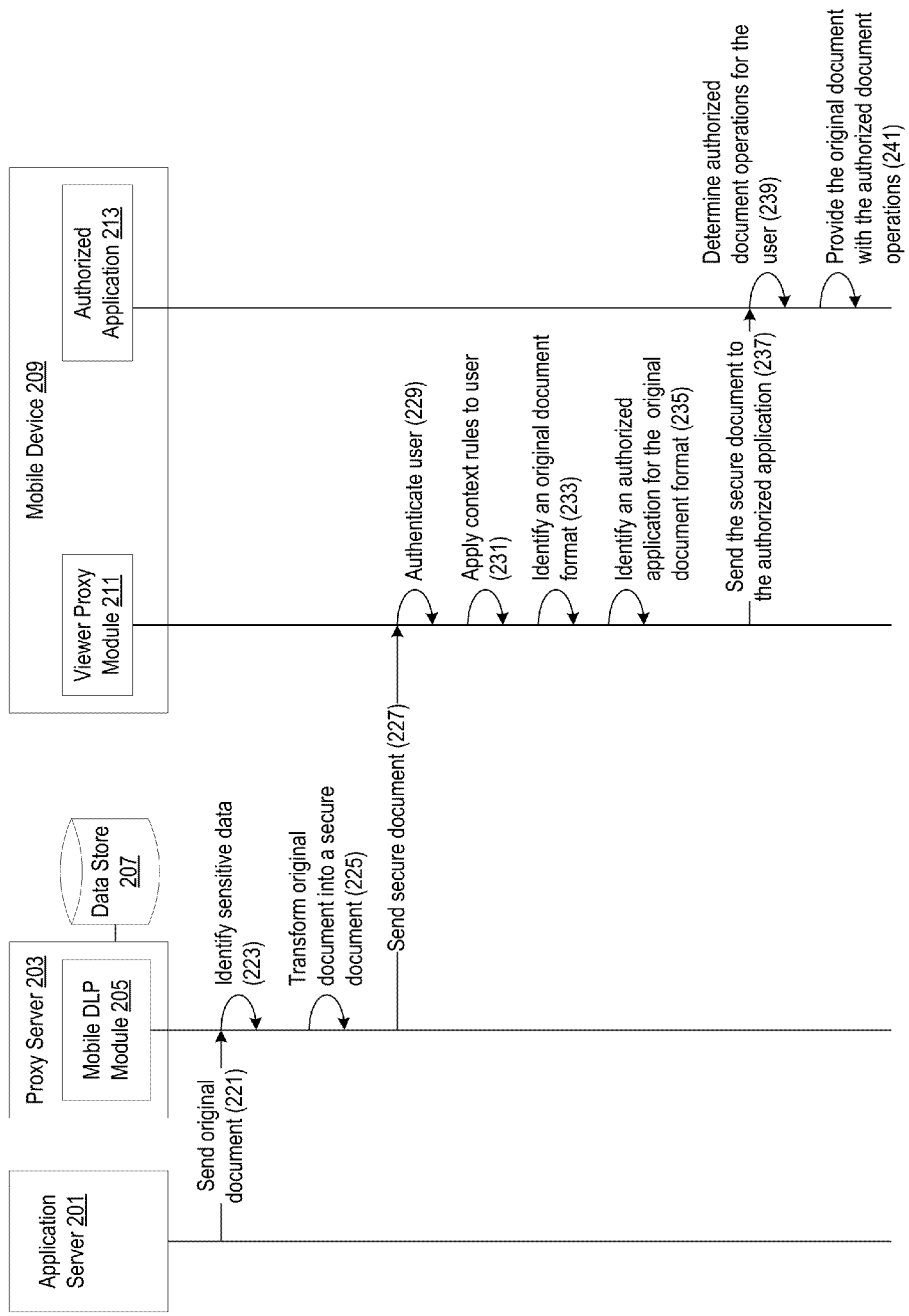
FIG. 2 is an implementation of a system for preventing the loss of sensitive data synchronized with a mobile device.

FIG. 2 is an implementation of a system for preventing the loss of sensitive data synchronized with a mobile device. The application server 201 can be the same as the application server 110 of FIG. 1. The proxy server 203 and the mobile DLP module 205 can be the same as the proxy server 130 and mobile DLP module 135 in FIG. 1. The mobile device 209 can be the same as mobile device 165 in FIG. 1. The viewer proxy module 211 and authorized application 213 can be the same as the viewer proxy module 170 and authorized application 180 in FIG. 1.

The application server 201 can send (221) an original document (e.g., message, PDF document, webpage, text document, spreadsheet document, database document, presentation document, CAD document, etc.) to the proxy server 203. The proxy server 203 can be coupled to one or more data stores 207 that store content rules data, policy data, and/or context rules data. The data stores 207 can be persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The mobile DLP module 205 in the proxy server 203 can use the content rules data in the data store 207 to identify (223) sensitive data in the original document. The mobile DLP module 205 can transform (225) the original document into a secure document. The mobile DLP module 205 can encrypt the sensitive data and include the encrypted data in the secure document. One implementation of the mobile DLP module 205 transforming the original document into a secure document is described in greater detail below in conjunction with FIG. 3. The mobile DLP module 205 can send (227) the secure document to the mobile device 209.

The viewer proxy module 211 in the mobile device 209 can receive the secure document and can authenticate (229) a user that is associated with the secure document. The user can be the intended recipient of the secure document. One implementation of the viewer proxy module authenticating the user is described in greater detail below in conjunction with FIG. 4. In one implementation, when the document is an email message that has a secure document attached, an email client on the mobile device 209 receives the email message from the proxy server 203. The viewer proxy module 211 may be launched when the user of the mobile device 209 tries to access (e.g., open) the secure document (e.g., attachment) that contains the sensitive data. If the user is successfully authenticated, the viewer proxy module 211 applies (231) one or more context rules in the secure document to the user's identity. For example, the authenticated user may be Jane Doe, and the viewer proxy module 211 may determine from the context rules whether Jane Doe is authorized to access the secure document.

If the user is successfully authenticated and authorized to access the secure document, the viewer proxy module 211 identifies (233) an original document format for the secure document. For example, the original document may be formatted as a text document, a spreadsheet document, a CAD document, etc. The viewer proxy module 211 identifies (235) an authorized application that corresponds to the original document format.

The viewer proxy module 211 sends (237) the secure document to the authorized application 213. The authorized application 213 determines (239) the document operations that are authorized for the user from the context rules in the secure document. Examples of document operations can include, and are not limited to, viewing the secure document, printing the secure document, sharing the secure document, modifying the secure document, saving the secure document, etc.

The authorized application 213 provides (241) the original document to the user with the authorized document operations enabled for the user. The authorized application 213 can provide the original document in a user interface (UI) on the mobile device. The user interface can be a graphical user interface (GUI). For example, the authorized application 213 decrypts the encrypted data in the secure document and provides the decrypted data to the user in a UI. The authorized application 213 can enable document operations that are authorized for the user in the UI and can disable document operations that are not authorized for the user in the UI. For example, the user may not be authorized to print the decrypted data and the authorized application 213 can disable the print option in the UI when providing the decrypted sensitive data to the user. In another example, the user may be authorized to save the decrypted sensitive data, and the authorized application 213 can enable the save option in the UI when providing the original document (e.g., decrypted sensitive data) to the user.

The authorized application 213 can monitor APIs (application programming interfaces) relating to the document operations (e.g., view, save, print, modify, share, etc.) and may have the secure document re-submitted to the proxy server 203 for DLP policy evaluation when the authorized application 213 detects that a document operation has been performed. For example, the authorized application 213 can monitor an API for saving files to determine whether the secure document is being saved by a user. The authorized application 213 may detect that the secure document is being saved and may send the saved version of the secure document to the mobile DLP module 205 on the proxy server 203. In one implementation, the viewer proxy module 209 resubmits the newly saved secure document to the mobile DLP module 205.

The mobile DLP module 205 can evaluate the newly saved secure document to determine whether the newly saved secure document contains sensitive data. If the newly saved secure document contains sensitive data, the mobile DLP module 205 can encrypt the sensitive data in the newly saved secure document and send an updated version of secure document to the mobile device 207. In one example, the user may remove sensitive data from the secure document and save the secure document. If the newly saved secure document does not contain sensitive data, the mobile DLP module 205 can decrypt the data in the secure document and send the decrypted data to the mobile device 209. In one implementation, when the secure document no longer contains sensitive data, the mobile DLP module 205 transforms the secure document into the original format and sends the original document to the mobile device. For example, the mobile DLP module 205 may remove the header.

Figure 3:
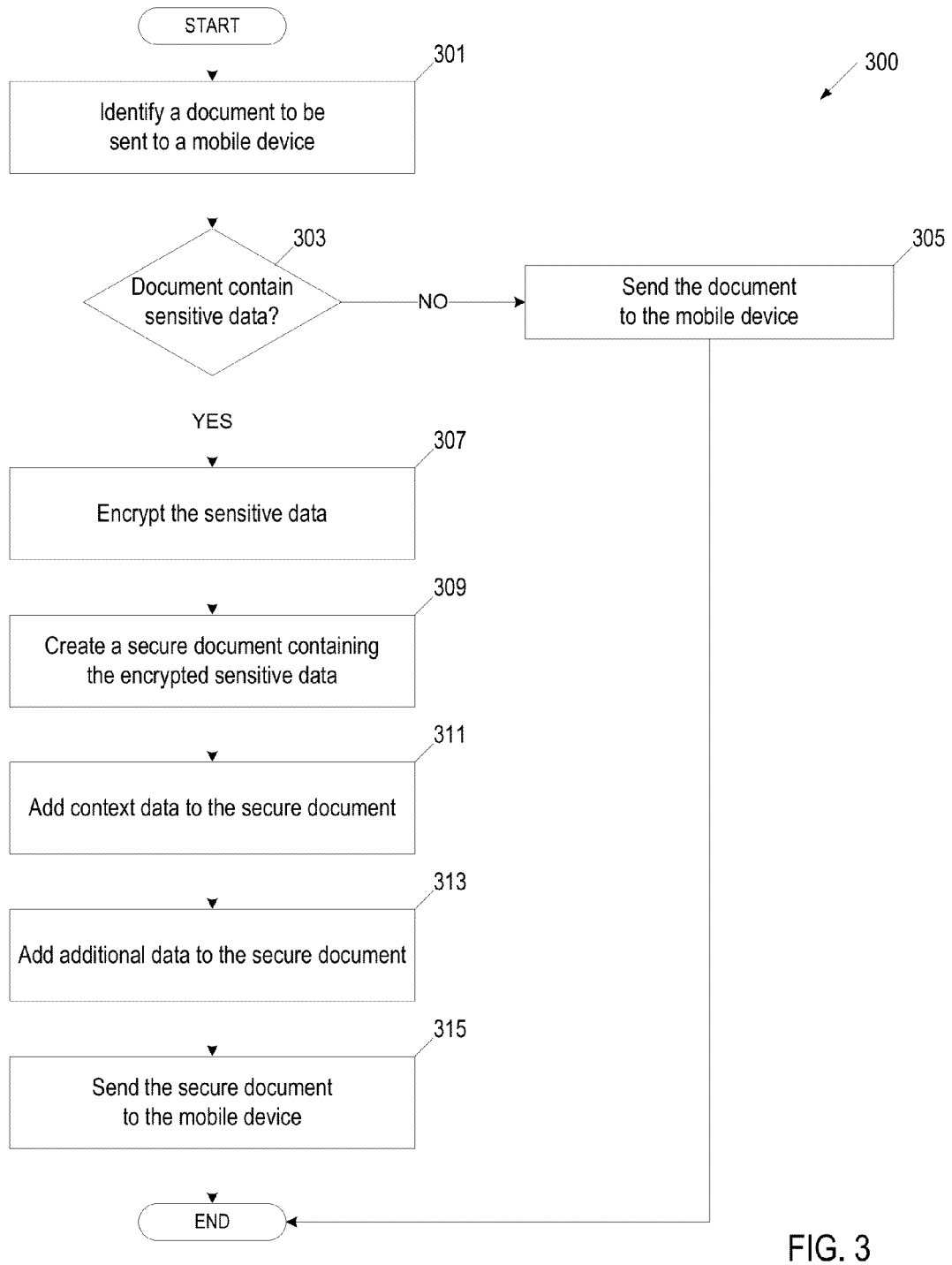
FIG. 3 is a flow diagram of an implementation of a method for creating a secure document to be sent to a mobile device for preventing the loss of sensitive data synchronized with the mobile device.

FIG. 3 is a flow diagram of an implementation of a method 300 for creating a secure document to be sent to a mobile device for preventing the loss of sensitive data synchronized with the mobile device. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a mobile DLP module 135 in a proxy server 130 of FIG. 1.

At block 301, the server identifies a document that is to be sent to a mobile device via one or more networks. The server can receive the document from an application server. The document can be, for example, and is not limited to, a message, PDF document, webpage, text document, spreadsheet document, database document, presentation document, CAD document, etc. The document can be an attachment to a message.

At block 303, the server determines whether the document contains sensitive data. The server can be coupled to a data store that stores content rules, which the server can use to determine whether the document contains sensitive data. The server can use one or more mechanisms and the content rules to determine whether the document contains sensitive data, such as, and not limited to, exact data matching, structured data fingerprinting, statistical methods, rule and regular expression matching, published lexicons, conceptual definitions, and keywords.

If the document does not contain sensitive data (block 303), the server sends the document to the mobile device at block 305. If the document does contain sensitive data (block 303), the server encrypts the sensitive data at block 307. The payload is the body data of the document. For example, the payload may be, and is not limited to, the body data of an email message, the body data of a text document, the body data of a spreadsheet, the body data of a CAD document, etc. The server can encrypt the payload using one or more encryption algorithms. The server can access configuration data that specifies the encryption algorithms that the server should use. The configuration data may be stored in a data store that is coupled to the server. In one implementation, when the sensitive data is in the payload of an email message, the server encrypts the body of the email message and creates an attachment that includes the encrypted payload. The server can redact the sensitive data in the payload of the email message and can add text to the body of the email message indicating that the attachment contains sensitive data.

At block 309, the server creates a secure document containing the encrypted sensitive data. The secure document can have a file extension that corresponds to a secure document format. For example, the server may use a proprietary secure document format for creating the secure document. For example, the server may create a secure document having a file name extension of ".sec" or ".sdf". Documents that are formatted in the proprietary secure document format can be accessed with a viewer that is registered for the proprietary secure document format and/or applications that have been wrapped with features for interpreting the proprietary secure document format.

At block 311, the server adds context data to the secure document. The context data can include one or more context rules that describe which users can access the secure document and what document operations (e.g., view, print, share, modify, save, etc.) the users can perform. For example, the context rules may specify that users that are at the executive level are authorized to perform all of the document operations. In another example, the context rules may specify that users that are in the accounting department are authorized to perform a subset of the document operations (e.g., view, modify, print, save). In another example, the context rules may specify that specific users are authorized to perform a subset of the document operations (e.g., view). The server can add the context rules to the secure document as a header to the encrypted payload. At block 313, the server adds additional data to the secure document. The additional data can include, for example, and is not limited to, the content rules that were matched for the document. At block 315, the server sends the secure document to the mobile device.

Figure 4:
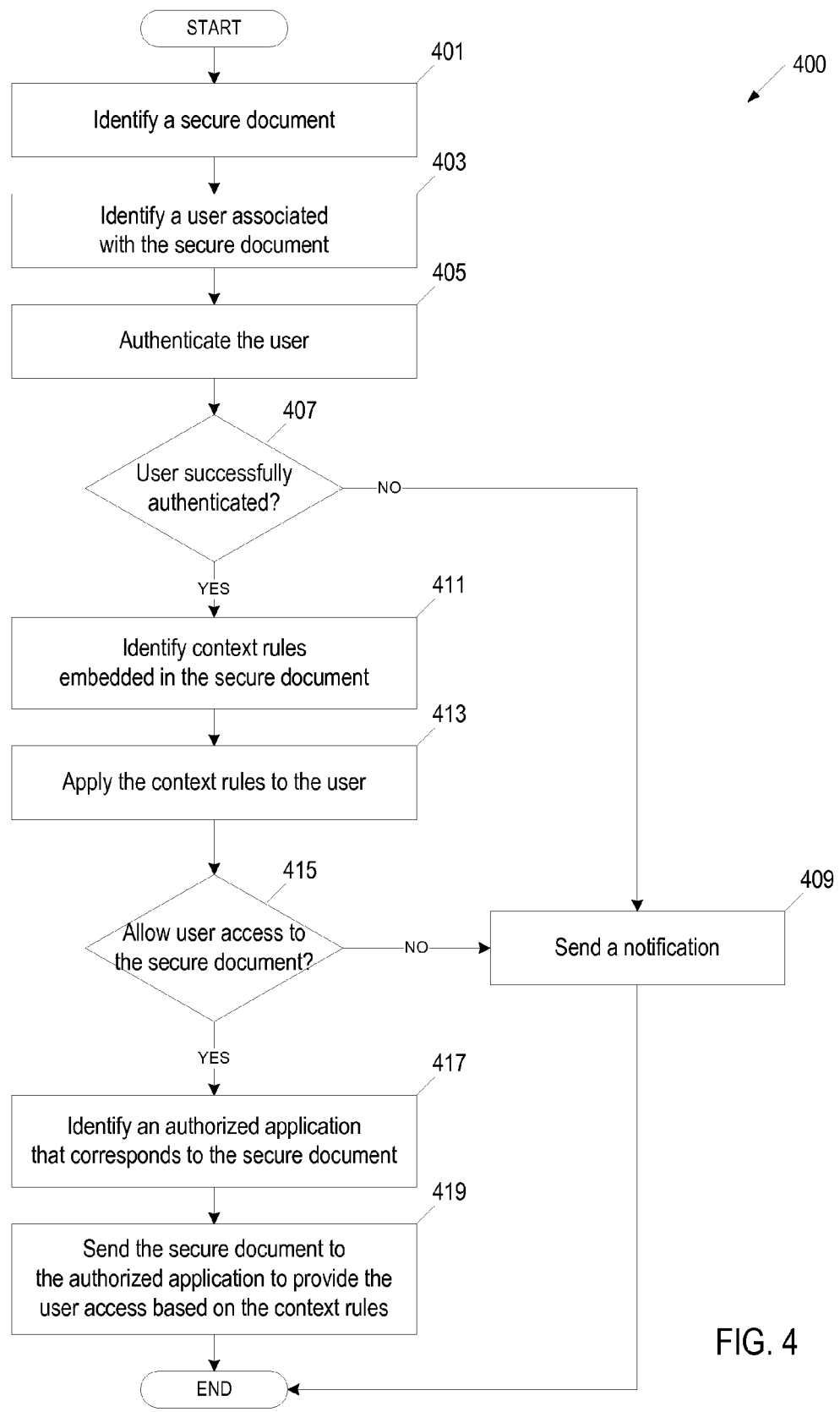
FIG. 4 is a flow diagram of an implementation of a method for preventing the loss of sensitive data synchronized with a mobile device.

FIG. 4 is a flow diagram of an implementation of a method 400 for method for preventing the loss of sensitive data synchronized with a mobile device. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a viewer proxy module 170 in a mobile device 165 of FIG. 1.

At block 401, the viewer proxy module identifies a secure document. The secure document may be received from a proxy server. At block 403, the viewer proxy module identifies a user that is associated with the secure document. For example, the user may be the intended recipient of the secure document. At block 405, the viewer proxy module authenticates the identity of the user. The viewer proxy module can provide data pertaining to the user to an authentication server and can receive an authentication result from the authentication server. For example, if the user has logged in to an Enterprise network using his/her Enterprise credentials, the viewer proxy module can communicate with the authentication server managing the user's Enterprise credentials to authenticate the identity of the user.

At block 407, the viewer proxy module determines whether the user is successfully authenticated based on the authentication result. If the user is not successfully authenticated, the viewer proxy module sends a notification at block 409. The viewer proxy module can send a notification to the user indicating that the user was not successfully authenticated. The notification can be an email message, a text message, an instant message, a social networking message, a visual alert, and/or a sound alert to notify the one or more users. A user that is not successfully authenticated can indicate that the user may not be part of any domain that is authorized to access the secure document.

If the user is successfully authenticated (block 407), the viewer proxy module identifies one or more context rules that are embedded in the secure document. The viewer proxy module can read a header of the secure document to read the one or more context rules. At block 413, the viewer proxy module applies the context rules to the user and determines whether the user is authorized to access the secure document based on the context rules at block 415.

If the user is not authorized to access the secure document, the viewer proxy module sends a notification at block 409. If the user is authorized to access the secure document (block 415), the viewer proxy module identifies an authorized application that corresponds to the secure document at block 417. The viewer proxy module can identify the original format of the secure document and can determine which authorized application corresponds to the original format. The viewer proxy module can access configuration data that is stored in a data store that is coupled to the view proxy module to determine which authorized application corresponds to the original format of the secure document and whether the authorized application is installed on the mobile device. At block 419, the viewer proxy module sends the secure document to the authorized application to provide the user access to the secure document. The authorized application can provide the secure document to the user in the original format. The authorized application can enable and/or disable document operations for the user based on the context rules. In one implementation, if the viewer proxy module does not locate an authorized application on the mobile device that corresponds to the secure document, the viewer proxy module can send a notification indicating that an authorized application is not installed on the mobile device.

Figure 5:
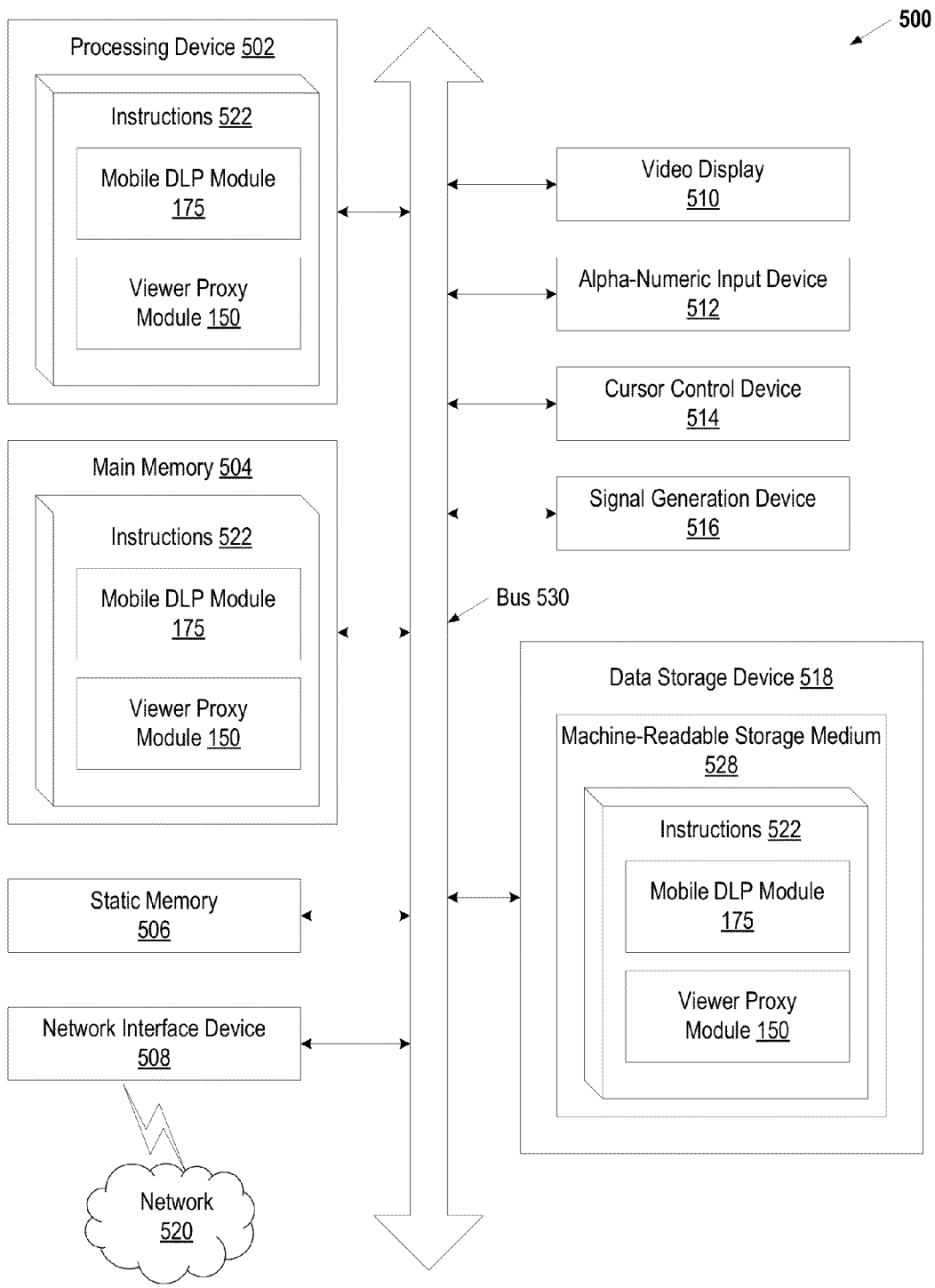
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. For example, the machine may be a mobile device (e.g., mobile device 165 in FIG. 1) that includes instructions 522 for a viewer proxy module (e.g., viewer module 170 of FIG. 1). In another example, the machine may be machine that hosts a proxy server (e.g., proxy server 130 in FIG. 1) and includes instructions 522 for a mobile DLP module (e.g., mobile DLP module 135 of FIG. 1). In alternative implementations, the machine may be connected (e.g., networked) to other machines in a LAN, an intranet, an extranet, and/or the Internet. The machine may operate in the capacity of a server or a client machine in client-server network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions 522 or software embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a mobile DLP module (e.g., mobile DLP module 135 of FIG. 1) and/or a software library containing methods that call modules in a mobile DLP module. In another implementation, the instructions 522 include instructions for a viewer proxy module (e.g., viewer proxy module 150 of FIG. 1) and/or a software library containing methods that call modules in a viewer proxy module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "sending" or "authenticating" or "reading" or "transforming" or "creating" or "adding" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving, by a mobile device executing a viewer proxy, a secure document transformed from an original document format including sensitive data, wherein the secure document comprises one or more context rules that correspond to the secure document, and wherein the original document format differs from a format of the secure document;
   authenticating, by the mobile device executing the viewer proxy, a user of the mobile device;
   determining, by the mobile device executing the viewer proxy in response to authenticating the user, whether the user is authorized to access the secure document based on the one or more context rules;
   identifying, by the mobile device executing the viewer proxy, the original document format for the secure document upon determining that the user is authorized to access the secure document;
   determining, by the mobile device executing the viewer proxy, that an authorized application corresponding to the secure document is installed on the mobile device; and
   providing, by the mobile device executing the viewer proxy and responsive to determining that the authorized application is installed on the mobile device, the secure document to the authorized application for accessing the sensitive data of the secure document using the original document format.

2. The method of claim 1, wherein determining whether the user is authorized to access the secure document comprises:
   authenticating an identity of the user;

determining a successful authentication of the identity of the user;

reading the one or more context rules in the secure document in response to the successful authentication; and determining that the user is authorized to access the secure document based on the one or more context rules.

3. The method of claim 1, wherein the one or more context rules indicate one or more document operations authorized for the user, the one or more document operations comprising at least one of viewing the secure document, printing the secure document, sharing the secure document, modifying the secure document, or saving the secure document.

4. The method of claim 3, wherein the one or more document operations are enabled for the user by the authorized application.

5. The method of claim 1, wherein the secure document comprises encrypted data to be decrypted by the authorized application.

6. The method of claim 1, wherein the secure document comprises a header containing the one or more context rules.

7. The method of claim 1, wherein the secure document is formatted using an extension corresponding to a secure document format.

8. A system comprising:

a mobile device comprising:

a memory; and a processing device, coupled with the memory, to:

receive, by the processing device executing a viewer proxy, a secure document transformed from an original document format including sensitive data, wherein the secure document comprises one or more context rules that correspond to the secure document, and wherein the original document format differs from a format of the secure document;

authenticate, by the mobile device executing the viewer proxy, a user of the mobile device;

determine, by the processing device executing the viewer proxy in response to authenticating the user, whether the user is authorized to access the secure document based on the one or more context rules;

identify, by the processing device executing the viewer proxy, the original document format for the secure document upon determining that the user is authorized to access the secure document;

determine, by the processing device executing the viewer proxy, that an authorized application corresponding to the secure document is installed on the mobile device; and providing, by the processing device executing the viewer proxy and responsive to determining that the authorized application is installed on the mobile device, the secure document to the authorized application for accessing the sensitive data of the secure document using the original document format.

9. The system of claim 8, wherein to determine whether the user is authorized to access the secure document comprises the processing device to:

authenticate an identity of the user;

determine a successful authentication of the identity of the user;

read the one or more context rules in the secure document in response to the successful authentication; and determine that the user is authorized to access the secure document based on the one or more context rules.

10. The system of claim 8, wherein the one or more context rules indicate one or more document operations authorized for the user, the one or more document operations comprising at least one of viewing the secure document, printing the secure document, sharing the secure document, modifying the secure document, or saving the secure document.

11. The system of claim 10, wherein the one or more document operations are enabled for the user by the authorized application.

12. The system of claim 8, wherein the secure document is formatted using an extension corresponding to a secure document format and wherein the secure document comprises at least one of encrypted data to be decrypted by the authorized application or a header containing the one or more context rules.

13. A non-transitory computer readable storage medium including instructions that, when executed by a processing device, cause the processing device to perform operations comprising:

receiving, a mobile device comprising the processing device and executing a viewer proxy, a secure document transformed from an original document format including sensitive data, wherein the secure document comprises one or more context rules that correspond to the secure document, and wherein the original document format differs from a format of the secure document;

authenticating, by the mobile device executing the viewer proxy, a user of the mobile device;

determining, by the mobile device executing the viewer proxy in response to authenticating the user, whether the user is authorized to access the secure document based on the one or more context rules;

identifying, by the mobile device executing the viewer proxy, the original document format for the secure document upon determining that the user is authorized to access the secure document;

determining, by the mobile device executing the viewer proxy, that an authorized application corresponding to the secure document is installed on the mobile device; and providing, by the mobile device executing the viewer proxy and responsive to determining that the authorized application is installed on the mobile device, the secure document to the authorized application for accessing the sensitive data of the secure document using the original document format.

14. The non-transitory computer readable storage medium of claim 13, wherein determining whether the user is authorized to access the secure document comprises:

authenticating an identity of the user;

determining a successful authentication of the identity of the user;

reading the one or more context rules in the secure document in response to the successful authentication; and determining that the user is authorized to access the secure document based on the one or more context rules.

15. The non-transitory computer readable storage medium of claim 13, wherein the one or more context rules indicate one or more document operations authorized for the user, the one or more document operations comprising at least one of viewing the secure document, printing the secure document, sharing the secure document, modifying the secure document, or saving the secure document.

16. The non-transitory computer readable storage medium of claim 15, wherein the one or more document operations are enabled for the user by the authorized application.

17. The non-transitory computer readable storage medium of claim 13, wherein the secure document is formatted using an extension corresponding to a secure document format and wherein the secure document comprises at least one of encrypted data to be decrypted by the authorized application or a header containing the one or more context rules.

\* \* \* \* \*